United States Patent Office 3,410,926
Patented Nov. 12, 1968

3,410,926
EPOXY RESIN COMPOSITIONS COMPRISING AMINOPLAST RESIN AND POLYCARBOXYLIC COMPOUND
Darrell D. Hicks, Louisville, Ky., assignor, by mesne assignments, to Celanese Coatings Company, a corporation of Delaware
No Drawing. Filed Jan. 9, 1964, Ser. No. 336,621
5 Claims. (Cl. 260—834)

This invention relates to film forming epoxy resin compositions. In another aspect, the invention relates to a novel combination of epoxy resins, aminoplast resins and polycarboxylic acids. In still another aspect, the invention pertains to a novel process for preparing film forming compositions utilizing epoxide resins.

Epoxy resins have attained considerable importance in the protective coatings field due to their superior chemical resistance, tenacious adhesion and extreme toughness. The class of epoxy resins which has achieved this commercial significance is the bisphenol-epichlorohydrin type, which can be represented by the formula

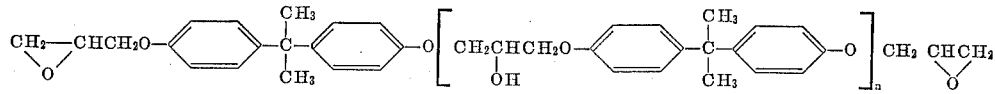

wherein $n$ is a number from 0 to 10 or higher.

Low molecular weight epoxy resins, wherein $n$ is 0 or at the most 2, can be cured to form products having good strength and chemical resistance. Such products are useful in the preparation of plastic materials such as pottings and castings. However, due to their low molecular weight, these epoxy resins have not been found to be particularly suited for use in preparing superior surface coatings, such as varnishes and the like. This is especially true in instances wherein aminoplast resins are used as the cross-linking agents.

The epoxy resins which are preferred in aminoplast resin systems are the ones in which $n$ is equal to at least 4. Not only do the protective coating films have excellent properties, but the resin solutions when applied to the substrate have good flow and leveling characteristics. However, due to the high molecular weight of the resins, high solids solutions are not practical, the viscosity of such solutions being so high as to make them very hard to work with. In order to reduce the viscosity to a workable range, a considerable amount of solvent must be utilized.

Coating compositions have been prepared by reacting a low molecular weight epoxy resin with a dicarboxylic acid forming a linear polymer which can be cured by subsequent reactions. Here again, the molecular weight of the polymers presents workability problems. Low solids and strong solvents are required to obtain solutions with viscosities low enough for spraying, flow coating, and dipping operations.

This invention contemplates the use of low molecular weight epoxide resins and aminoplast resins in combination with polycarboxylic acids to make excellent film forming compositions. In carrying out this invention, the said three components are simply blended together with solvent in the proper ratios, films are prepared from the blend solution and the polymerization and curing reactions take place in the film. Specifically, the reactions that occur in the film are: (1) the reaction of a carboxylic acid group and an epoxide group with the formation of an ester group and a hydroxyl group; and (2) the reaction of the formed hydroxyl group with the aminoplast resin resulting in a cross-linked structure.

In this process, excellent protective coating films are produced from low molecular weight epoxide resins, said films being at least comparable in all respects with films prepared from high molecular weight epoxide resins and aminoplast resins. These low molecular weight epoxide resins have better compatibility and solubility with solvents and additives than high molecular weight epoxide resins.

Another advantage of the process of this invention is the reaction of the epoxide resin and the polycarboxylic acid in the film. This "film" reaction eliminates the necessity of prereacting the carboxylic acid and epoxide resin as has been previously required. This prereaction step with its requirements for careful control of reactant ratios and reaction conditions is thereby avoided.

The epoxide resins which have been found suitable for application in this invention are the polyglycidyl-polyethers of dihydric phenols having an epoxide equivalent weight of 120 to 1000. Such resins are readily available from the reaction of an epihalohydrin or a dihalohydrin with a dihydric phenol. Dihydric phenols from which these epoxide resins are prepared include p,p'-dihydroxydiphenyl propane (or bisphenol as it is commonly known), resorcinol, dihydroxy diphenyl, dihydroxy diphenyl sulfone, dihydroxy diphenyl sulfide, and the like.

The aminoplast condensates to be employed in this invention are urea-aldehyde and triazine aldehyde resins and alcohol modified derivatives thereof, that is alkylated amino resins wherein the alkyl radical contains from 1 to 8 carbon atoms. Such aminoplast resins are the reaction products of aldehydes, for instance formaldehyde, acetaldehyde and the like, with urea, substituted ureas, thioureas, ethylene urea, dicyandiamide, melamine, benzoguanamine, acetoguanamine and the like. The resulting methylol substituted products are etherified with alcohols, for example isopropanol, butanol and 2-ethyl hexanol, in order to obtain stability and organic solubility. Such organic soluble aminoplast resins are contemplated for use in this invention.

The polycarboxylic compounds are aliphatic polycarboxylic acids and the acid terminated reaction products of polyols and cyclic anhydrides, the acid value of these acids and acidic esters being in the range of 100 to 750. The aliphatic dicarboxylic acids include adipic acid, pimelic acid, suberic acid, azelaic acid, sebacic acid, still-bottom acids resulting from the manufacture of sebacic acid having an average acid value of 160, and the so-called dimer acids, which are dimers of unsaturated fatty acids. The acid terminated reaction products of polyols and cyclic anhydrides are the products obtained by reacting a polyol and a cyclic anhydride wherein the mols of anhydride are equivalent to the hydroxyl groups of the polyol. Polyols which are useful in this invention are 1,4 butanediol, 1,5 pentanediol, hexanediol, polyethylene glycols having molecular weights of 106 to 600, polypropylene glycols having molecular weights of 134 to 750, and ethylene oxide, propylene oxide and butylene oxide adducts of dihydric phenols. The cyclic carboxylic acid anhydrides are phthalic anhydride, tetrahydrophthalic anhydride, hexahydrophthalic anhydride, maleic anhydride, succinic anhydride and the like.

Additional polycarboxylic compounds are acids and acid terminated reaction products of polyols and cyclic anhydrides which contain more than two acid groups. Such acids include the trimer acids which are trimers of drying oil acids and other unsaturated fatty acids. The acid terminated reaction products of polyols and cyclic anhydrides are those products resulting from the coreaction of diols, hereinbefore described, wtih polyfunctional anhydrides, for instance trimellitic anhydride, pyromellitic dianhydride, rosin-maleic anhydride adducts and fatty acid-maleic anhydride adducts, or from the coreaction of dicarboxylic acid anhydrides hereinbefore described, with polyols containing more than two hydroxyl groups, for example trimethylol ethane, trimethylol propane, glycerine, pentaerythritol, dipentaerythritol and the like. A particular advantage of this invention is that polycarboxylic compounds having more than two carboxylic acid groups can be used. Highly cross-linked films can be obtained by the coreaction of the epoxide resin, the polyfunctional acid and the aminoplast resin. Heretofore, attempts to pre-react tri- or higher functional acids with epoxide resins followed by reaction with aminoplast resins have been unsuccessful, due to premature gelation of the pre-reaction products. In this invention, these more functional acidic compounds can be utilized since the reactions occur in the film, thereby eliminating the premature gelation problem.

The acid terminated esters of the cyclic carboxylic acid anhydrides and the aliphatic polyols are prepared by reacting 1 gram molecular proportion of an aliphatic diol with 2 gram molecular proportions of the cyclic anhydride; 1 gram molecular proportion of an aliphatic triol with 3 gram molecular proportions of the cyclic anhydride, etc. In other words, one mol of the anhydride compound is reacted per each hydroxyl group of the aliphatic polyol. These acid terminated esters are readily prepared by reacting the aliphatic polyol and the anhydride compound in the desired proportions at a temperature of 150° C. to 200° C. Solvents can be used to facilitate stirring of the reactants, such solvents being ketones, aromatic hydrocarbons and esters of ether alcohols.

In preparing the coating compositions of this invention, the epoxy resin, the aminoplast condensate and the polycarboxylic compound are blended together, preferably in solution in one or a mixture of organic solvents in the proportions of 0.5 to 1.5 carboxylic acid groups to 1 epoxide group and in the weight proportions of 50 percent to 90 percent of the epoxide resin and the polycarboxylic acid compound to 50 percent to 10 percent of the aminoplast condensate. Catalysts, such as tertiary amines, tertiary amine salts and salts of quaternary ammonium compounds, can be incorporated in these blends in the amounts of 0.1 percent to 2.0 percent based on the total weight of the blend. However, excellent cures can be obtained wherein no catalyst is used.

Cured compositions are prepared by applying a solution of the blend of this invention to the surface of an article to be coated by the usual means such as spraying, flow coating, or dipping and heating the film at a temperature of 100° C. to 200° C. for fifteen to forty-five minutes, sufficient to cure the film to an insoluble, infusible coating.

The following examples will more clearly illustrate the practice of this invention. The terms "parts" and "percent," where used, are intended to mean "parts by weight" and "weight percent" respectively. The epoxide resins used in these examples are identified as Epoxide Resin A, Epoxide Resin B, etc. These designated epoxide resins are made from epichlorohydrin and bisphenol in the proportions listed below and have the listed epoxide equivalent weight and melting point.

| Epoxide Resin | Epichloro-hydrin, Mols | Bisphenol, Mols | Epoxide Equivalent Weight | Melting Point, ° C. |
|---|---|---|---|---|
| A | 10 | 1 | 190 | 8 |
| B | 2 | 1 | 360 | 42 |
| C | 1.57 | 1 | 480 | 70 |
| D | 1.22 | 1 | 925 | 100 |

EXAMPLE 1

To a one liter flask equipped with stirrer, thermometer and reflux condenser are added 232.5 parts of hexahydro-phthalic anhydride and 67.5 parts of trimethylol propane. Heat is applied raising the temperature to 180° C. The reactants are held at 180° C. for two hours and are then cooled. The clear homogeneous tri(hexahydrophthalic) ester of trimethylol propane has a Gardner-Holdt viscosity of Z-3 to Z-4 at 50 percent solids in xylene.

The tri(hexahydrophthalic) ester of trimethylol propane (3.5 parts) and 10.5 parts of Epoxide Resin C are dissolved in sixteen parts of xylene with ten parts of a 60 percent solution of a butylated urea-formaldehyde resin in xylene and butanol. Films, prepared on glass using a 3 mil doctor blade applicator, are well cured after a thirty minute bake at 150° C. These films are extremely hard and mar resistant and have excellent adhesion. Films prepared on electrolytic tin plate are cured at 150° C. for thirty minutes. These films pass a 28 inch-pound bump test, and exhibit excellent resistance to one hour of boiling water.

EXAMPLE 2

To a one liter flask equipped as described in Example 1 are added 238.2 parts of hexahydrophthalic anhydride and 61.8 parts of trimethylol ethane. Heat is applied raising the temperature to 180° C. The reactants are held at 180° C. to 200° C. for two hours and are then cooled. The clear tri(hexahydrophthalic) ester of trimethylol ethane has a Gardner-Holdt viscosity of Z-2 to Z-3 at 60 percent solids in xylene.

The tri(hexahydrophthalic) ester of trimethylol ethane (2.5 parts) and Epoxide Resin C (7.5 parts) are mutually dissolved in 12.3 parts of xylene along with 16.7 parts of a 60 percent solution of butylated urea-formaldehyde resin in butanol and xylene. Films are prepared on glass using a 3 mil doctor blade applicator. After a thirty minute bake at 150° C., the films are well cured and have excellent mar resistance and adhesion.

EXAMPLE 3

To a one liter flask equipped as described in Example 1 are added 245.7 parts of hexahydrophthalic anhydride and 54.3 parts of pentaerythritol. Heat is applied raising the temperature to 190° C. The temperature is held at 171° C. to 190° C. for two hours. The tetra(hexahydrophthalic) ester of pentaerythritol product is dissolved in 200 parts of xylene, 50 parts of toluene and 50 parts of ethylene glycol monoethyl ether acetate.

To 10.8 parts of a 50 percent solution of the tetra(hexahydrophthalic) ester of pentaerythritol in the solvent mixture hereinbefore described are added 6.6 parts of Epoxide Resin A, 13.3 parts of a 60 percent solution of butylated urea-formaldehyde resin in xylene and butanol, and 9.3 parts of xylene. Films, prepared on glass, are well cured after heating at 150° C. for thirty minutes. These films have outstanding adhesion, mar resistance and resistance to boiling water.

EXAMPLE 4

To a one liter flask equipped as described in Example 1 are added 230.4 parts of phthalic anhydride, 69.6 parts of trimethylol propane and 10 parts of diisobutyl ketone. The temperature is raised to 170° C. and is held at 170° C. to 180° C. for two hours and thirty minutes. A small sample is withdrawn and remains clear upon cooling indicating complete reaction. The tri(phthalic) ester of trimethylol propane is thinned with 55 parts of xylene, 100 parts of ethylene glycol monoethyl ether acetate, and 211.7 parts of propylene glycol methyl ether. The resulting solution has a solids content of 44.3 percent and a Gardner-Holdt viscosity of A-2 to A-1.

To 7.9 parts of the solution of tri(phthalic) ester of trimethylol propane hereinbefore described are added 15.8 parts of a 66.7 percent solution of Epoxide Resin C in xylene, 10 parts of a 60 percent solution of butylated urea-formaldehyde resin in xylene and butanol, and 6.3 parts of xylene. Films, prepared from this solution, are well cured after a thirty minute bake at 150° C., exhibiting excellent adhesion, mar resistance and resistance to boiling water.

EXAMPLE 5

To a one liter flask equipped as described in Example 1 are added 198.3 parts of polypropylene glycol (750 molecular weight), 101.7 parts of trimellitic anhydride, and 20 parts of xylene. The temperature of the reactants is raised to 189° C. and is held at 189° C. to 208° C. for three hours and thirty minutes. The xylene is removed by distillation and the resulting di(trimellitic) ester of polypropylene glycol-750 is thinned with 24.2 parts of toluene and 125.8 parts of propylene glycol methyl ether.

To 7.3 parts of the above described solution of di(trimellitic) ester of polypropylene glycol-750 are added 13.7 parts of a 66.7 percent solution of Epoxide Resin C in xylene, 10 parts of a 60 percent solution of butylated urea-formaldehyde resin in xylene and butanol, 0.33 part of a 60 percent solution of benzyl trimethyl ammonium chloride in water and 9 parts of propylene glycol methyl ether. Well cured films are obtained after a thirty minute bake at 150° C. These films have outstanding mar resistance and excellent adhesion.

Films are prepared from a solution of the di(trimellitic) ester of polypropylene glycol-750 and Epoxide Resin D, the solution being made up as follows:

| | Parts |
|---|---|
| 66.7 percent solution of Epoxide Resin D in xylene and ethylene glycol monobutyl ether | 16.1 |
| Solution of di(trimellitic) ester of polypropylene glycol-750 described above | 4.9 |
| 60 percent solution of butylated urea-formaldehyde resin in xylene and butanol | 10.0 |
| 60 percent solution of benzyl trimethyl ammonium chloride in water | 0.33 |
| Propylene glycol methyl ether | 9.0 |

Excellent well-cured films are obtained after a thirty minute bake at 150° C.

EXAMPLE 6

To a one liter flask equipped as described in Example 1 are added 383.5 parts of phthalic anhydride, 116.5 parts of 1,4-butanediol and 50 parts of xylene. Heat is applied raising the temperature to 148° C. The temperature is held at 148° C. for two hours. The xylene solvent is then removed by vacuum distillation.

The di(phthalic) ester of butanediol (3.5 parts) and Epoxide Resin C are dissolved in 15.8 parts of xylene. To this solution are added 10 parts of a 60 percent solution of a butylated urea-formaldehyde resin in xylene and butanol, and 0.33 part of a 60 percent solution of benzyl trimethyl ammonium chloride in water. Films, prepared from this solution and heated at 150° C. for thirty minutes, are well cured and have excellent mar resistance, hardness and adhesion.

EXAMPLE 7

A solution is prepared from 16 parts of a 75 percent solution of Epoxide Resin B in xylene, 8 parts of dimerized cottonseed oil acids having an acid value of 183, 13 parts of a 66 percent solution of a butylated melamine-formaldehyde resin in xylene and butanol, 0.4 part of a 60 percent solution of benzyl trimethyl ammonium chloride in water and 9.7 parts of xylene. Films, prepared from this solution, are well cured after thirty minutes at 150° C. The films have excellent flexibility, excellent adhesion and good mar resistance.

EXAMPLE 8

A solution is made up of the following components: 16 parts of a 75 percent solution of Epoxide Resin B in xylene, 8 parts of the trimerized cottonseed oil acids having an acid value of 186, 8.3 parts of a 60 percent solution of butylated urea-formaldehyde in xylene and butanol, 0.4 part of a 60 percent solution of benzyl trimethyl ammonium chloride in water, 6 parts of ethylene glycol monoethyl ether acetate, and 1.8 parts of xylene. Well cured films are obtained after a thirty minute bake at 150° C.

EXAMPLE 9

A solution is made from the following components: 11.1 parts of a 65 percent solution of Expoxide Resin C in ethylene glycol monoethyl ether, 4.8 parts of commercially available stillbottom acids resulting from the manufacture of sebacic acid and having an acid value of 160, 16 parts of a 50 percent solution of butylated urea-formaldehyde resin in xylene and butanol, 0.33 part of a 60 percent solution of benzyl trimethyl ammonium chloride in water and 8.1 parts of diacetone alcohol. Well cured films are obtained after a fifteen minute bake at 200° C. These films have very good mar resistance and high gloss.

Films, prepared from blends of epoxide resins, aminoplast resins and polycarboxylic compounds, can be used in can coatings both as protective liners and as decorative finishes. Maximum performance finishes for home appliances can also be readily obtained from the compositions of this invention both in primer formulations and in enamel finish coats.

What is claimed is:

1. A heat curable composition comprising a homogeneous mixture of
    (a) a glycidyl polyether of a dihydric phenol having an epoxide equivalent weight of 120 to 1000,
    (b) a thermosetting aminoplast resin, and
    (c) a polycarboxylic compound selected from the group consisting of aliphatic tricarboxylic acids, and reaction products of cyclic carboxylic acid anhydrides and aliphatic polyols reacted in the proportions of 1 mol of cyclic carboxylic acid anhydride for each hydroxyl group of the aliphatic polyol, forming acid terminated esters, said polycarboxylic compound having an acid value of 100 to 770 said ingredients being dissolved in an organic solvent in proportions of 0.5 to 1.5 carboxylic acid groups of (c) to one epoxide group of (a) and 50 weight percent to 90 weight percent of (a) plus (c) with 50 weight percent to 10 weight percent of (b), the total being 100 per cent.

2. The composition of claim 1 wherein the glycidyl polyether of a dihydric phenol is the glycidyl polyether of p,p'-dihydroxydiphenyl propane having an epoxide equivalent weight of 480,
    the thermosetting aminoplast resin is a butylated urea-formaldehyde resin, and the polycarboxylic compound is the tri(hexahydrophthalic) ester of trimethylol propane.

3. The composition of claim 1 wherein the glycidyl polyether of a dihydric phenol is the diglycidyl ether of p,p'-dihydroxydiphenyl propane,
    the thermosetting aminoplast resin is a butylated urea-formaldehyde resin, and the polycarboxylic compound is tetra(hexahydrophthalic) ester of pentaerythritol.

4. A protective coating composition comprising, in an organic solvent, a homogeneous mixture of 46 weight percent of a glycidyl polyether of p,p'-dihydroxydiphenyl propane having an epoxide equivalent weight of 480, 30 weight percent of a butylated urea-formaldehyde resin and 24 weight percent of a di(trimellitic) ester of polypropylene glycol, said polypropylene glycol having a molecular weight of 750.

5. A process for preparing a cured coating composition comprising
    blending in an organic solvent
    (a) a glycidyl polyether of a dihydric phenol having an epoxide equivalent weight of 120 to 1000, (b) a thermosetting aminoplast resin, and
(c) a polycarboxylic compound selected from the group consisting of aliphatic dicarboxylic acids, aliphatic tricarboxylic acids, and reaction products of cyclic carboxylic acid anhydrides and aliphatic polyols reacted in the proportions of 1 mol of cyclic carboxylic acid anhydride for each hydroxyl group of the aliphatic polyol, forming acid terminated esters, said polycarboxylic compound having an acid value of 100 to 770
in the proportions of 0.5 to 1.5 carboxylic acid groups of (c) to one epoxide group of (a) and 50 weight percent to 90 weight percent of (a) plus (c) with 50 weight percent to 10 weight percent of (b), the total being 100 percent, applying said blend to a substrate, and heating said blend and substrate at a temperature of 100° C. to 200° C. for a time sufficient to cure said coating composition.

References Cited
UNITED STATES PATENTS

| | | | |
|---|---|---|---|
| 2,528,360 | 10/1950 | Greenlee | 260—834 |
| 2,947,712 | 8/1960 | Belanger et al. | 260—18 |
| 3,196,117 | 7/1965 | Boller | 260—834 |
| 3,219,602 | 11/1965 | Scheibli | 260—21 |
| 3,235,620 | 2/1966 | Phillips et al. | 260—834 |
| 3,280,056 | 10/1966 | Masters | 260—21 |
| 3,294,574 | 12/1966 | Salame | 260—834 |
| 3,317,457 | 5/1967 | Zimmerman | 260—834 |
| 3,331,805 | 7/1967 | Mandel | 260—834 |

FOREIGN PATENTS 939,358  10/1963  Great Britain.

DONALD E. CZAJA, *Primary Examiner.*

R. W. GRIFFIN, *Assistant Examiner.*